United States Patent [19]

Glover et al.

[11] Patent Number: 5,327,952
[45] Date of Patent: Jul. 12, 1994

[54] PNEUMATIC TIRE HAVING IMPROVED WET TRACTION

[75] Inventors: William E. Glover, Akron; John S. Attinello, Hartville; Samuel P. Landers, Uniontown, all of Ohio

[73] Assignee: The Goodyear Tire & Rubber Company, Akron, Ohio

[21] Appl. No.: 955,961

[22] Filed: Oct. 2, 1992

Related U.S. Application Data

[63] Continuation-in-part of Ser. No. 666,811, Mar. 8, 1991.

[51] Int. Cl.$^5$ .............................................. B60C 11/11
[52] U.S. Cl. .................................................. 152/209 R
[58] Field of Search ....................... 152/209 R, 209 D; D12/144-151

[56] References Cited

U.S. PATENT DOCUMENTS

| | | | |
|---|---|---|---|
| D. 283,499 | 4/1986 | Hammond . | |
| D. 283,500 | 4/1986 | Graas . | |
| D. 311,893 | 11/1990 | Covert et al. | D12/147 |
| D. 312,993 | 12/1990 | Guermandi et al. | D12/146 |
| D. 328,444 | 8/1992 | Graas | D12/147 |
| D. 335,115 | 4/1993 | Suzuki | D12/147 |
| 4,078,596 | 3/1978 | Nakayama et al. . | |
| 4,667,175 | 5/1987 | Graas . | |
| 4,687,037 | 8/1987 | Pfeiffer et al. . | |
| 4,700,762 | 10/1987 | Landers . | |
| 4,765,384 | 8/1988 | Rhode . | |
| 4,962,801 | 10/1990 | Tsuda . | |
| 5,047,483 | 9/1991 | Halasa et al. . | |

FOREIGN PATENT DOCUMENTS

| | | |
|---|---|---|
| 0296605 | 6/1988 | European Pat. Off. . |
| 0503404A1 | 2/1992 | European Pat. Off. . |
| 3624408 | 2/1988 | Fed. Rep. of Germany . |
| 3643046 | 6/1988 | Fed. Rep. of Germany . |
| 3723368 | 3/1989 | Fed. Rep. of Germany . |
| 0100503 | 9/1978 | Japan . |
| 63-87302 | 4/1988 | Japan . |
| 0022601 | 1/1989 | Japan . |
| 2106403 | 4/1990 | Japan . |
| 2193933 | 2/1988 | United Kingdom . |
| 2231538 | 11/1990 | United Kingdom . |

OTHER PUBLICATIONS

"Tire Materials & Construction"; Automotive Engineering; Oct. 1992, pp. 23-28.
Abstract of JP 63-260306, Apr. 10, 1990.
Hannoversche Allgemeine Zeitung Car Brochure, p. 39, no date.
Contentinal Product Brochure, Sep. 1991.
Auto Parts Guide, Oct. 1991.
European Rubber Journal, Apr. 1990.
Modern Tire Dealer 1988.
Automotive Engineering, May 1990.

*Primary Examiner*—Michael W. Ball
*Assistant Examiner*—Nancy T. Krawczyk
*Attorney, Agent, or Firm*—David E. Wheeler

[57] ABSTRACT

A directional pneumatic tire having improved wet traction has two annular aqua channels and curved lateral grooves which direct water from the footprint to the shoulder area of the tire to help prevent hydroplaning. The pitch boundaries between the portions of the tire on either side of the aqua channels may be skewed. The curved lateral grooves and the skewing reduce noise properties of the tire. In addition, the lugs may have rounded or radiused leading and trailing edges, and a leading groove wall angle of about 5° and a trailing groove wall angle of about 1°, which are believed to reduce noise and irregular wear. The lugs contain slots which change direction within the lug and tie bars in the slots at each point where the slots change direction. The tread has non-skid depth of 0.75 to 1 cm (0.030 to 0.40 inch) and a ratio of non-skid to tie bar depth of 0.42.

4 Claims, 8 Drawing Sheets

PNEUMATIC TIRE HAVING IMPROVED WET TRACTION

This is a continuation-in-part of U.S. patent application 07/666,811 filed Mar. 8, 1991.

BACKGROUND OF THE INVENTION

The invention relates to pneumatic tires which have improved wet traction and handling characteristics as well as improved noise and irregular wear characteristics.

This application is related to copending application U.S. Ser. Nos. 07/666,816; D667,100; 07/666,329; 07/666,327; and 07/666,328 incorporated herein by reference.

Hydroplaning of tires on wet pavement has long been a problem in the prior art. Hydroplaning is caused by a tire when running on wet pavement, because the tire pushes water in front of it as it advances, until the back pressure of the water is sufficient to lift the tire off the road. The pressure of the water is a function of the depth of the water and the speed of the tire. Various tire designs, adapted to channel water away from the tire, and thereby maintain rubber contact with the road, have been tried by the prior art to correct this problem. Although prior art rain tire designs have improved wet traction, it is a continuing goal in the art to further improve wet traction.

It is an object of the present invention to provide a pneumatic tire having improved wet traction while having good handling, improved noise and improved irregular wear characteristics.

Other objects of the invention will be apparent from the following description and claims.

DEFINITIONS

"Aqua Channel" refers to an extra wide circumferential groove with angled (non parallel), rounded groove walls designed specifically to channel water out of the footprint contact patch of the tire.

"Aspect Ratio" of the tire means the ratio of its section height to its section width.

"Bead" means that part of the tire comprising an annular tensile member wrapped by ply cords and shaped, with or without other reinforcement elements such as flippers, chippers, apexes, toe guards and chafers, to fit the design rim.

"Contact Patch" refers, in footprints separated into two or more portions by wide void areas, to those portions of the footprint that maintain contact with the pavement.

"Carcass" means the tire structure apart from the belt structure, tread, undertread, and sidewall rubber over the plies, but including the beads.

"Crown" refers to the circumferentially outermost portion of the carcass substantially within the width limits of the tread.

"Design Cycle" is a mold manufacturing term that refers to the smallest fundamental unit of tire tread that contains all design features and is continually repeated around the tire with slightly varying lengths according to a specific pitching sequence.

"Design Cycle Pitch" is a mold manufacturing term that refers to the circumferential distance from the beginning boundary of a design cycle to its end and the beginning boundary of the next design cycle.

"Design Net-to-gross" refers to the undeflected tread as designed and molded and is the calculated ratio of the expected ground contacting surface area of the tread, excluding groove void area, to the total expected tread footprint area including the groove void area.

"Design rim" means a rim having a specified configuration and width.

"Directional tread" refers to a tread design which has a preferred direction of rotation in the forward direction of travel.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground contacting surface area of the tread to the total tread footprint area including the groove void area.

"Groove" means an elongated void area in a tread that may extend circumferentially or laterally about the tread in a straight, curved, or zig-zag manner. Grooves ordinarily remain open in the tire footprint. Circumferentially and laterally extending grooves sometimes have common portions and may be subclassified as "wide" or "narrow". Grooves may be of varying depths in a tire. If such narrow or wide grooves are of substantially reduced depth as compared to wide circumferential grooves which they interconnect, they are regarded as forming "tie bars" tending to maintain a rib-like character in the tread region involved.

"Logarithmic spiral" refers to a spiral that has a gradually expanding arc, as opposed to a substantially constant arc as in for example an Archemedic spiral (i.e. as seen in a phonograph record).

"Lugs" refer to discontinuous radial rows of tread rubber in direct contact with the road surface.

"Net-to-gross" refers to the ratio of the ground contacting surface of a tread to the total tread area.

"Normal load and inflation pressure" refers to the specific design inflation pressure and load assigned by the appropriate standards organization for the design rim and service condition for a tire of specific size. Examples of standards are the Tire and Rim Association Manual and the European Tire and Rim Technical Organization.

"Open angle" refers to a groove wall angle which causes the groove to be wider at the top as compared to its width at the tread base.

"Pitch" refers to the circumferential distance from one design feature in the tread pattern to the next similar design feature.

"Pitch boundary" refers to a substantially lateral line in the circumference of the tire that defines the beginning or end of the pitch. The pitch boundary may sometimes be defined by the center of a lateral groove. A pitch boundary "shift" refers to a circumferential displacement of the line.

"Pitch Tone" refers to a potentially objectionable sound in which the sound energy is concentrated into a narrow frequency band and is perceived essentially as a single frequency that clearly stands out from the surrounding background noise.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Rib" means a circumferentially extending strip of rubber on the tread which is defined by at least one circumferential "wide groove" and either a second such groove or a lateral edge of the tread, the strip of rubber being laterally undivided by full-depth narrow or wide grooves.

"Shoulder" refers to the upper portion of sidewall just below the tread edge.

"Sidewall" means that portion of a tire between the tread and the bead.

"Sipes" refer to small slots molded into ribs of a tire that subdivide the tread surface and improves traction characteristics. Sipes tend to close completely in a tire footprint.

"Slots" are elongated void areas formed by steel blades inserted into a cast or machined mold or tread ring. Slots ordinarily remain open in a tire footprint. In the appended drawings, slots are illustrated by single lines because they are so narrow.

"Tie-Bar" refers to an extra thickness of rubber at the bottom of a slot such that, in the locations where the extra rubber is present, the slot depth is less than the slot depth at all other locations. Tie-bars stabilize a lug by limiting the independent movement of two portions of a lug that are separated by slots, while traction properties that are inherent in the use of slots are provided.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

"Turn-up ply" refers to an end of a carcass ply that wraps around one bead only.

SUMMARY OF THE INVENTION

A pneumatic tire, for use on paved surfaces and having an aspect ratio of 0.35 to 0.80, comprising a pair of annular beads, carcass plies wrapped around the beads, a tread disposed over the carcass plies in a crown area of the tire and sidewalls disposed between the tread and the beads is provided. The tread of the tire is directional and has a footprint net-to-gross ratio of 50% to 70% and at least one annular aqua channel having the cross section of a curvate-U and having a width of about 10 to 22% of total treadwidth based on a footprint of the tire. The aqua channel has a depth of about 78 to 100% of total tread depth. The tread has lateral grooves which comprise at least a portion of an S-shape wherein a lateral groove has a leading end initiating within the annular aqua channel and a trailing end terminating in a shoulder area of the tire. The lateral groove intersects circumferential grooves between the aqua channel and the shoulder, and intersections of circumferential grooves and lateral grooves define lugs. The lugs are traversed by slots which contain tie bars which stabilize the lug while having the traction properties associated with slots. The tread depth is about 0.76 to 1 cm (0.30 to 0.42 in) and the ratio of tire bar thickness to tread depth is 0.32 to 0.46.

The lugs have an open leading edge groove wall angle of 3° to 8° and a trailing edge wall angle of 0° to 2°.

In a preferred embodiment, the circumferential grooves are discontinuous and the lugs are connected laterally by bridges of rubber.

Also preferred is an embodiment where the slots change direction in the lug and the tie bars are located at points where the direction of the slot changes.

The leading and trailing edges of the lugs may be radiused to improve irregular wear and noise properties.

In the illustrated embodiment, the slot changes direction in each lug twice such that one circumferential edge (42) of a lug has a trailing portion which is much wider than its concurrent leading portion, and another circumferential edge (43) has a leading portion much wider than a concurrent trailing portion. The widest part of each circumferential edge is substantially bisected by a notch (44) which substantially parallels a portion of a slot (17) in the same lug and is substantially aligned with a slot (17) in an adjacent lug.

The aqua channel and the lateral grooves provide a means for expelling large volumes of water from the tire footprint contact patch. When the annular grooves are not continuous (when the lugs are connected by bridges), the tires have excellent groove wander characteristics as well as improved irregular wear and noise properties. The leading edge open angle of 3° and 8° also improves noise and wear properties while the trailing edge open angle of 0° to 2° provides good braking traction. It is believed that a boundary shift between the two tread portions provides additional improved noise characteristics by orienting the two sides of the tread design to be out of phase.

DETAILED DESCRIPTION OF THE INVENTION

Figure 1:
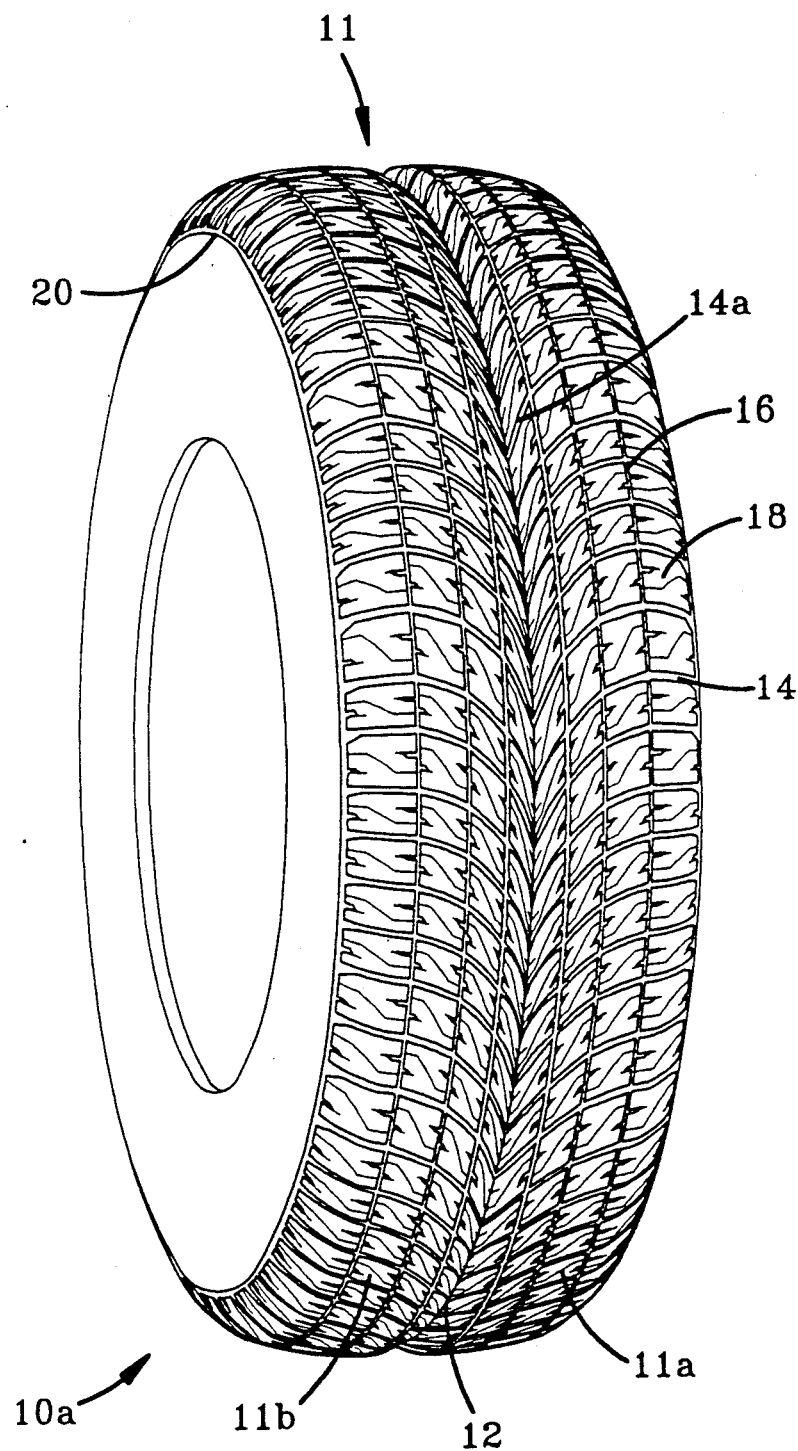
FIG. 1 is a perspective view of one embodiment of a tire of the invention.

With reference now to FIG. 1, tire 10a has a tread portion 11 which is divided into two parts, 11a, 11b by aqua channel 12. Curved lateral grooves 14 initiate in aqua channel 12 and take an uninterrupted arcuate path to shoulder 20. Circumferential grooves 16 intersect lateral grooves 14 forming lugs 18.

When driving on wet roads, the presence of the lateral grooves in the aqua channel substantially facilitates the flow of water from the aqua channel into the lateral grooves and out of the footprint of the tire through the shoulder. The curvature of the lateral grooves is such that the center or initial portion 14a of a lateral groove is in the leading edge of the footprint initiating the flow of water before the rest of the lateral groove enters the footprint. As the main portion of the lateral groove 14 enters the footprint, water in lateral groove 14 is expelled through the shoulder area with great force. This, together with the aqua channel, help prevent water back pressure from building up in front of the tire, and helps maintain rubber contact between the tire and the pavement.

The tread of the tire of the invention is directional since, if the tire is mounted such that the center portion 14a of the lateral groove enters the footprint last, water would be channeled toward, instead of away from the aqua-channel 12.

In the illustrated embodiments, the tread has a designed total net-to-gross ratio of 45% to 70%, preferably 45% to 60%. In the part of the tread that touches the road (the contact patch) (i.e. excluding the aqua channel), the tread has a net-to-gross ratio of about 60% to 90%, preferably 68% to 80% and in the illustrated embodiments about 73%. In the illustrated embodiment the overall design net-to-gross ratio is about 55%. It is believed that the high traction properties of the tire, even when the overall net to gross is very low, is partially attributable to the fact that there is a large amount of rubber in contact with the road in the portions of the tire that contact the road.

The design width of aqua channel 12 may comprise about 15-30% of the total tread width based on the tire design. In the illustrated embodiment, the design width of the aqua channel is about 25% of the overall tread width.

In a tire footprint under design load and pressure, with width of the aqua channel is 10%-22%, preferably about 15%, and the overall footprint net to gross is about 50% to 70%, preferably about 55 to 65%. In the illustrated embodiment the footprint net to gross is about 60%. In the contact patch, the part of the tire that touches the road (the footprint excluding the aqua channel), the net-to-gross is about 60%-80% preferably 65% to 75%. In the illustrated embodiment the contact patch net-to-gross is about 70%.

The depth of the aqua channel may comprise 78% to 100%, preferably 82% to 92% of the total tread depth (about 0.91 cm (0.36 in)). By total tread depth it is meant the distance from the tread base to the land area of a lug. In the illustrated embodiment the aqua channel depth is about 83% of the total tread depth or about 0.13 cm (0.05 in) less than the total depth. This depth has been chosen since it insures that the aqua channel will be present throughout the tread life of the tire since the tread wear indicators have a thickness of 0.16 cm (0.06 in).

Figure 2:
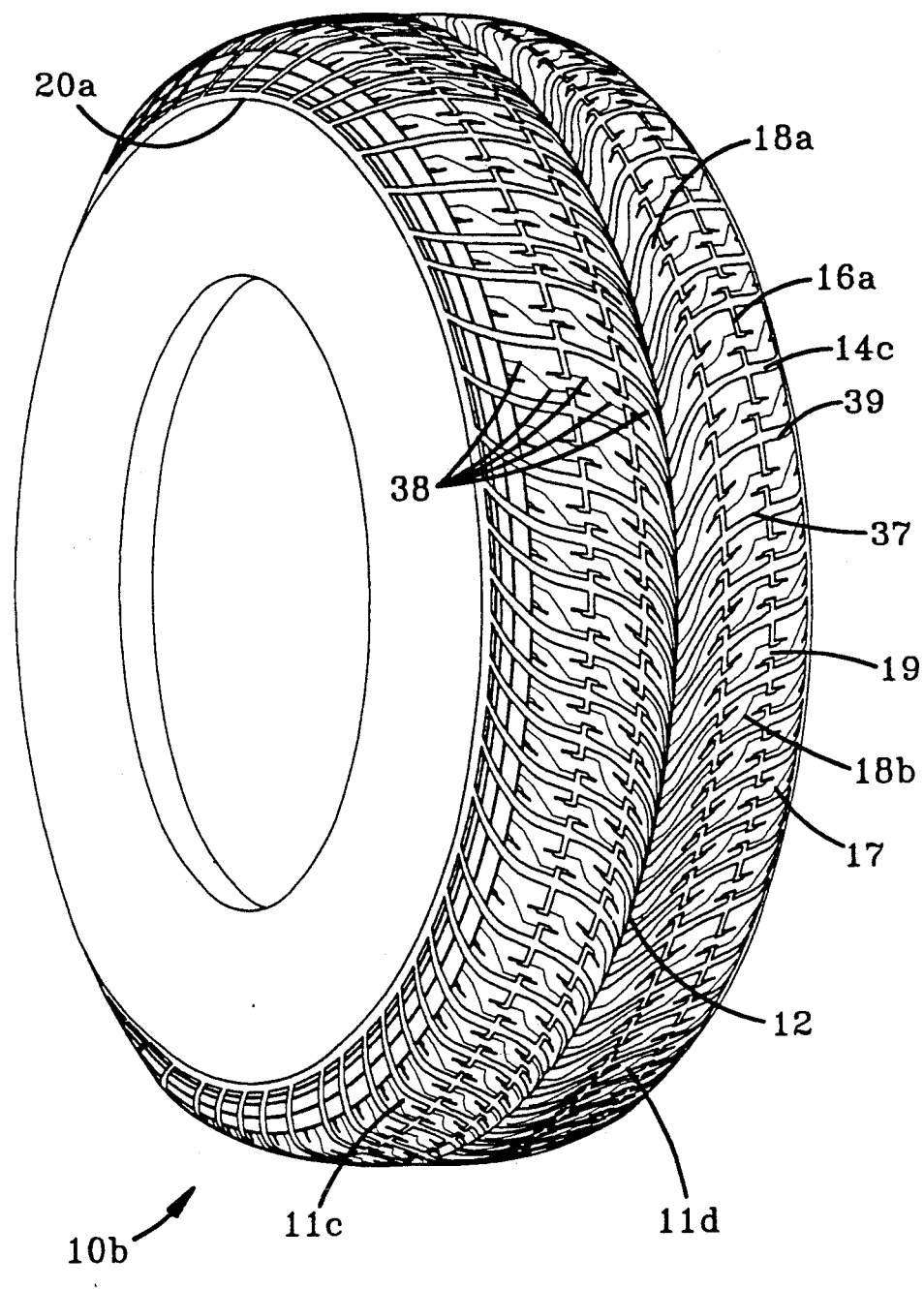
FIG. 2 is a perspective view of a second embodiment of a tire of the invention.

With reference now to FIG. 2 in an alternative embodiment of the tire 10b of the invention, aqua channel 12 divides tread area 11 into two parts 11c, 11d which each have an S-shaped lateral groove 14c. For convenience in defining the various embodiments, as used herein, S-shaped includes the shape of an S and its mirror image. Also, curved lateral groove 14 (FIG. 1) can be said to be a portion of an S-shape (about ½ of an S).

Figure 3:
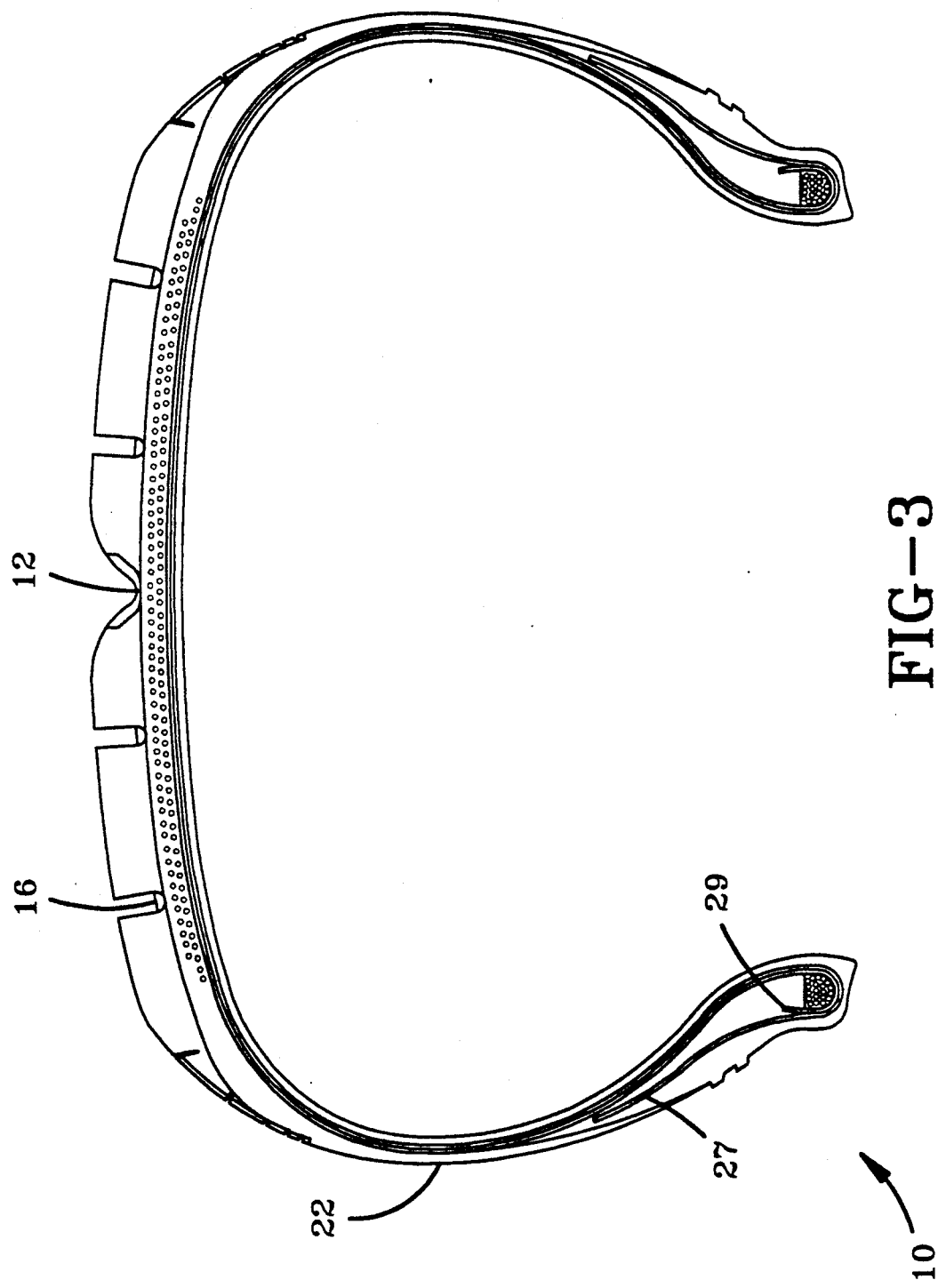
FIG. 3 illustrates a cross section of the tire.

It should be noted that the lugs 18a adjacent to aqua channel 12 are contoured into the aqua channel, forming a part of the aqua channel such that the aqua channel has a curvate U shape (having a rounded bottom and curved sides) substantially as shown in FIG. 3, and that the lateral grooves 14 initiate well into the aqua channel and have approximately the same depth as the aqua channel.

The curvate U (rounded) shape of the channel provides for smooth flow of water into the channel and out of the footprint of the tire and for improved lateral traction in the tire.

Those skilled in the art recognize that flow around circumferential grooves that have sharp sidewalls is turbulent and the flow at any portion of the circumferential groove is dependent on whether a lateral groove is near that portion of the groove.

Also, the curvature of the walls of the curvate U of the channel is similar to the curvature of the shoulder of the tire and in effect, provides a second shoulder for gripping the road and providing improved lateral control and handling properties.

Figure 6:
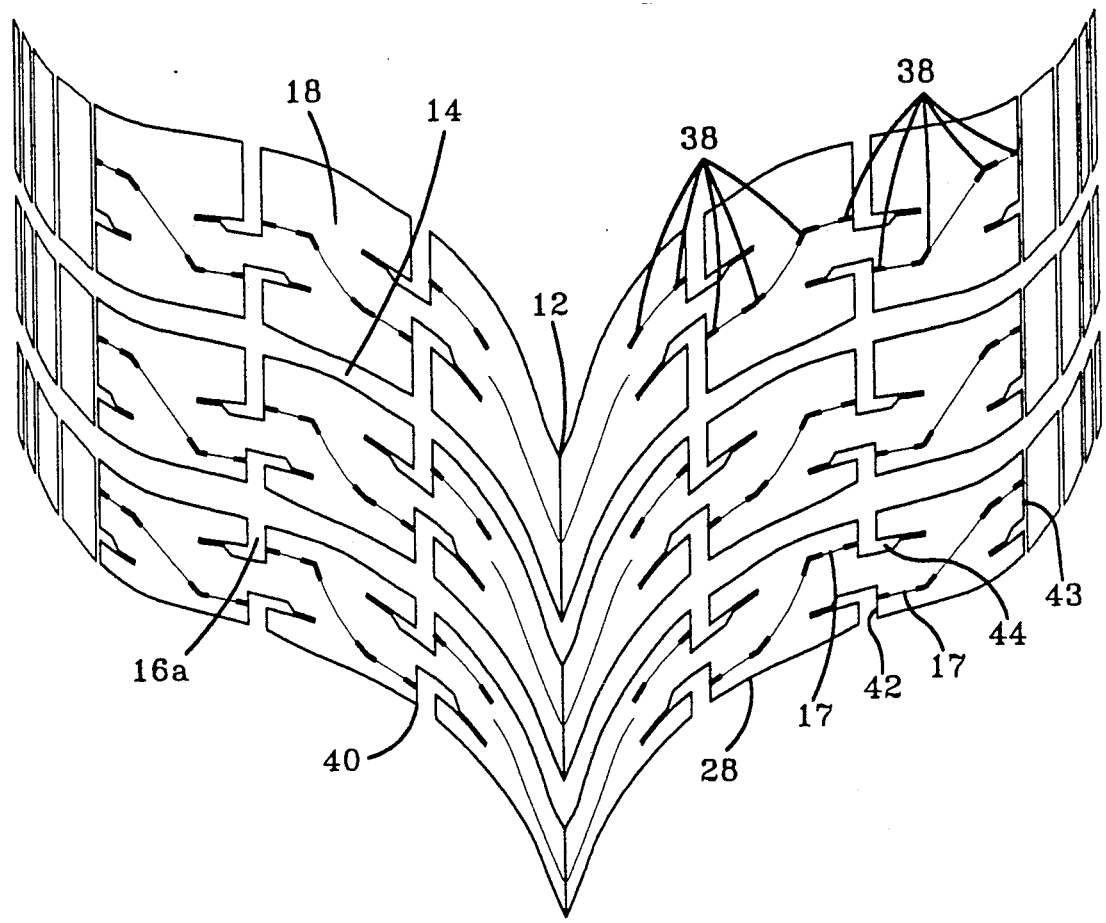
FIG. 6 illustrates a portion of the tread pattern of the tire showing the curved pitch.

As best illustrated in FIGS. 1, 2 and 6, lugs 18 comprise a leading portion 37 and a trailing portion 39 which are separated laterally by slot 17. Slot 17 changes direction in each lug at least twice so that in one circumferential edge 42 each lug has a trailing portion which is much wider than its concurrent leading portion (about 1.5 to 2.5 times as wide), and in the other circumferential edge 43 of the lug, the leading portion is much wider (about 1.5 to 2.5 times as wide) than the trailing portion. Tie bars 38 are located at each change in direction of slot 17. It is believed that this configuration provides a stable yet flexible lug both circumferentially and laterally.

In the illustrated embodiment, slots 17 are about 0.79 cm (0.31 in) deep (measured from the surface of the tread) and tie bars 38 are about 0.53 cm (0.21 in) deep.

In general, it is believed that a tire according to the invention may have a ratio of tie bar thickness/tread thickness of 0.35 to 0.46, preferably 0.42, and a tie bar thickness/channel rubber thickness of 2.7 to 3.3, preferably 3.

In addition, the widest part of each circumferential edge is substantially bisected by a notch 44 which substantially parallels slot 17 in that portion of the lug and is substantially aligned with the slot 17 in the adjacent lug. This arrangement divides the circumferential edges of the lug into three parts and divides the lug, through its central portion on an angle (having a circumferential vector and a lateral vector), into two parts.

The tire of the invention may be made to utilize a $\beta$ pitch sequence, an RPAH sequence, or any other pitching that is found to be acceptable for a given road surface or purpose.

Pitching as it relates to tires, is well characterized by the prior art as illustrated by U.S. Pat. No. 4,474,223 to Landers and references cited therein.

In the illustrated embodiments each nominal rib of the tire has 61-64 lugs that are divided into random pitch arrangements which contain small, medium, and large pitches. The ratio of the length of a small pitch to the length of a medium pitch is about 1.1 to 1.23, and the ratio of the length of a small pitch to the length of a large pitch is about 1.2 to 1.53, depending on the size of the tire. In the illustrated embodiment, a small pitch represents a length of about 22.6 mm, a medium pitch is about 29.1 mm and a large pitch is about 40.1 mm. Because of the curvature of lateral grooves 14, the pitch boundary is curved.

In the embodiment of tire 10b, tread portions 11c and 11d are skewed. By skewed, it is meant there is a pitch boundary shift between tread portion 11c and tread portion 11d. Because of the pitch boundary shift, the lugs in the two portions of the tire enter into the footprint at different times reducing the amplitudes of the various sound frequencies generated by the tire during its rotation. It is believed that skewing shifts the phase angles of the sound waves generated by the two portions of the tire reducing tire noise by destructive interference and reduction in the amplitudes of the various frequencies at given instants in time. The pitch boundary shift may be, approximately, a ¼ small pitch or a small pitch shift, a ½ medium pitch or a medium pitch shift, a ½ large pitch or a large pitch shift.

In the illustrated embodiment, a ½ medium pitch shift is preferred.

In tire 10b, lateral groove 14 is intersected by circumferential grooves 16a which are discontinuous, interrupted by bridges 19. For brevity of description, the term grooves embraces both the discontinuous grooves of tire 10b and the continuous grooves of tire 10a.

In the embodiment of tire 10b, lugs or lug segments 18b between pairs of lateral grooves 14a may be characterized as a single element or block since lug segments 18b are connected to each other by bridges 19. Thus, bridge 19 connects the leading portion 37 of one lug with the trailing portion 39 of an adjacent lug, and tie bars 38 provide a connection between the different parts of the lugs such that the tie bars 38 and bridges 19 together provide a continuous block element from the shoulder to the center of the tire.

In the illustrated embodiment, the bridges have a width that comprises about 10% to 20%, preferably 14% to 17% of the width of the block elements to which they are attached In the prior art, it has been shown that long lateral lugs are particularly prone to irregular wear, presumably because of the distortion of the lug and the resulting squirm when part of a lug is in a footprint and part of the lug is outside the footprint. In the lug configuration of tire 10b, although bridges 19 tie the lugs 18 together into one continuous block, providing lateral stability to the tire, the small amount of rubber employed in bridges 19, and slots 17, allow the lugs limited independent movement, as the block element enters the footprint, reducing the amount of squirm and consequent irregular wear. The lateral stability attributed to the bridges provides good handling and cornering properties.

Bridges 19 also substantially eliminate groove wander since they prevent the circumferential grooves 16a from locking into longitudinal road grooves.

Bridges 19 also maintain the width of grooves 16a in the footprint, assuring the widest possible flow path for the longitudinal grooves. Tie bars 38 cause each set of lugs between a pair of lateral grooves to act together, stiffening the tread and reducing relative strain of individual lugs.

For the same reasons that a rubber band hums when it is stretched and relaxed, it is believed that at least some tire noise is caused by the acceleration of the lugs when the lug is released from a footprint and the lug is restored from distortion. Since lugs 18 are tied together and support one another, it is believed that the amount of distortion of the lugs is minimized and that the acceleration of the lug coming out of the footprint is damped, in both cases reducing the noise of the tire.

The S-shape of the lateral groove extends the lateral groove deep into the shoulder area 20a and causes lateral groove 14c to curve into shoulder 20a at an angle. The curvature of the groove at the shoulder reduces the contact impact of the lugs at the shoulder area as the lug enters the footprint, because of a transitional entering of the lug into the footprint, thereby further reducing energy of impact, distortion, and the noise of the tire.

The S-shaped lateral grooves, and their directional orientation also aid the rolling resistance and braking properties of the tire. When moving in the forward direction, the transitional shape of the lugs and their relationship to one another cause the lugs to move in concert, similar to the stroking of a feather with the grain. On braking, however, the lugs try to separate and spread out, having the same effect as stroking a feather against the grain.

With reference now to FIG. 3, the carcass of the tire may comprise at least one high turn up ply 27 and at least one low turn up ply 29 to improve the stiffness of tire sidewall 22.

Figure 4:
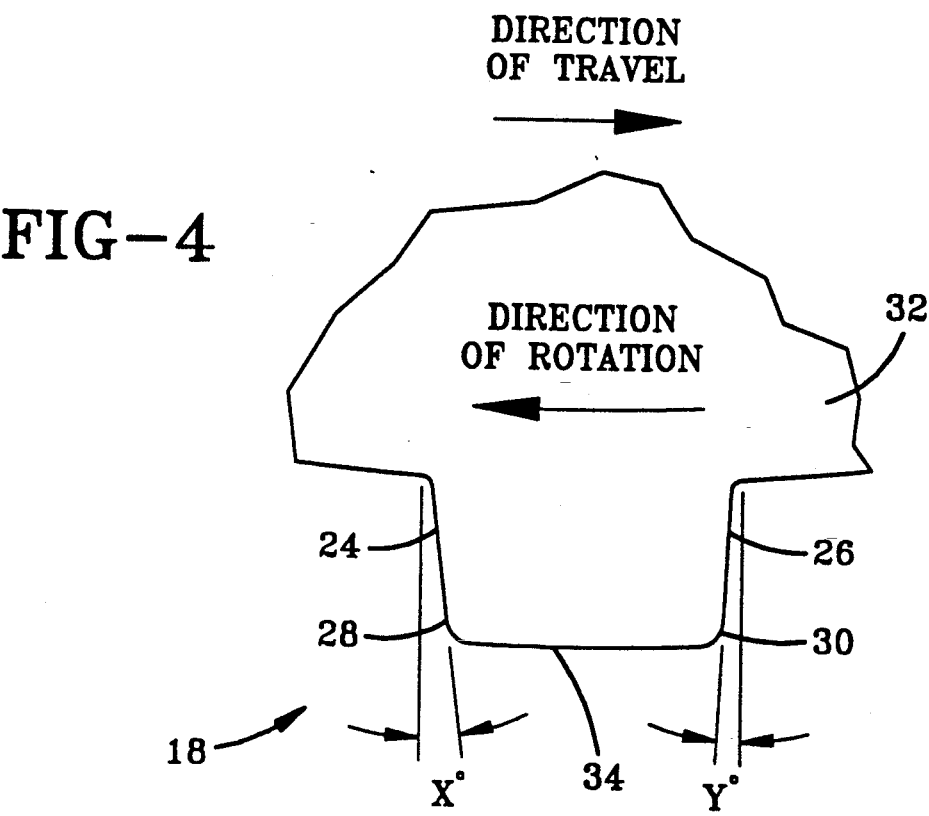
FIG. 4 illustrates a lug of the tire.

With reference now to FIG. 4, in a preferred embodiment lug 18 may be shaped to have a leading edge groove wall 24 having an open angle of 3° to 8°, preferably about 5°, and a trailing edge groove wall 26 having an open angle of 0° to 2°, preferably about 1°. Accordingly, the lugs have a trapezoidal shape having a base corresponding to the tread base 32 and a top corresponding to the land area 34 of the lug. The large open angle on the leading edge is believed to improve irregular wear properties because the angle of impact of the lug into the footprint is reduced. The open angle also has a buttressing effect on the lug, stabilizing the leading edge and increasing its stiffness. Increased stiffness and a lower angle of impact reduces the amount of energy absorbed by the lug as it enters the footprint, limiting the distortion of the lug, and reducing squirm. Reduced squirm reduces irregular wear.

Also, the wider groove area at the top of the groove may enhance the flow of water out of the footprint.

The smaller angled trailing edge is believed to help maintain braking traction. The smaller angle provides a sharper element edge which keeps water from flowing under the element.

In the illustrated embodiment, because of manufacturing considerations, the trailing groove wall has an angle of 0°.

In addition, to help noise properties, and to enhance irregular wear properties, leading edge 28 and trailing edge 30 may be rounded or radiused. In the illustrated embodiment, a radius of 0.15 cm (0.06 in) to 0.25 cm (0.10 in), preferably 0.020 cm (0.08 in) is used. The rounding of the edges is also believed to reduce the effects of squirming by allowing the lug to roll or rotate into the footprint.

It has been discovered that rounding the edges of the lugs also improves the grind appearance of the tire.

Figure 4A:
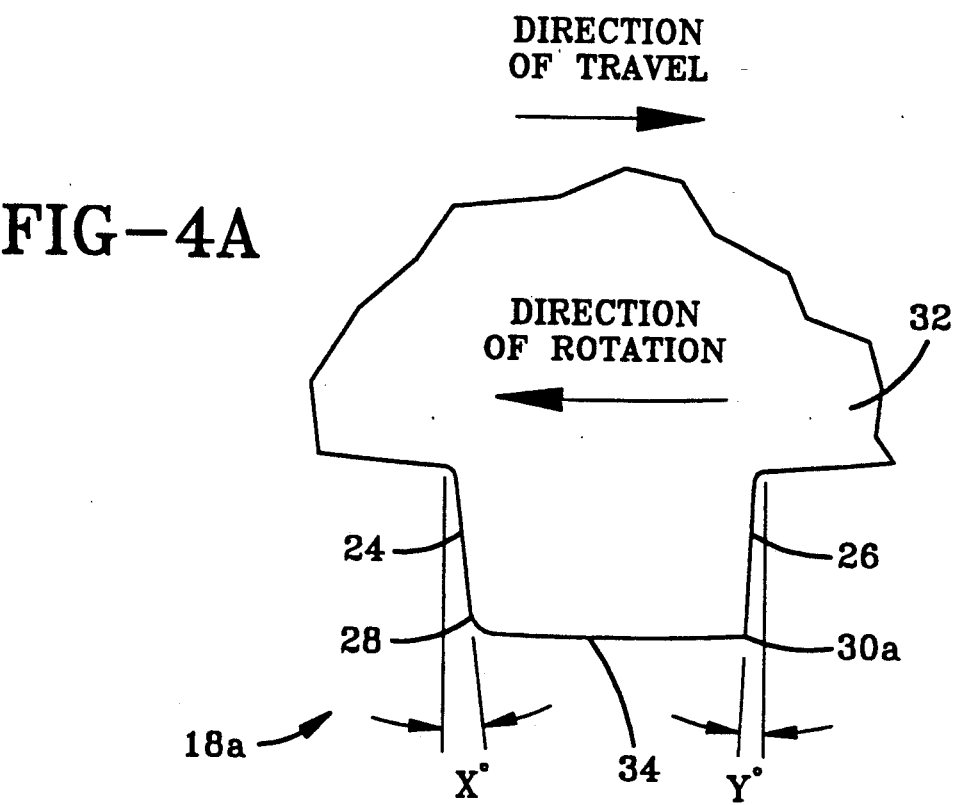
FIG. 4A illustrates an alternative lug of the tire.

FIG. 4A illustrates an alternative embodiment of lug 18A which has a sharp trailing edge 30a. A sharper trailing edge is believed to be advantageous in those applications where enhanced braking traction is desired.

Figure 5:
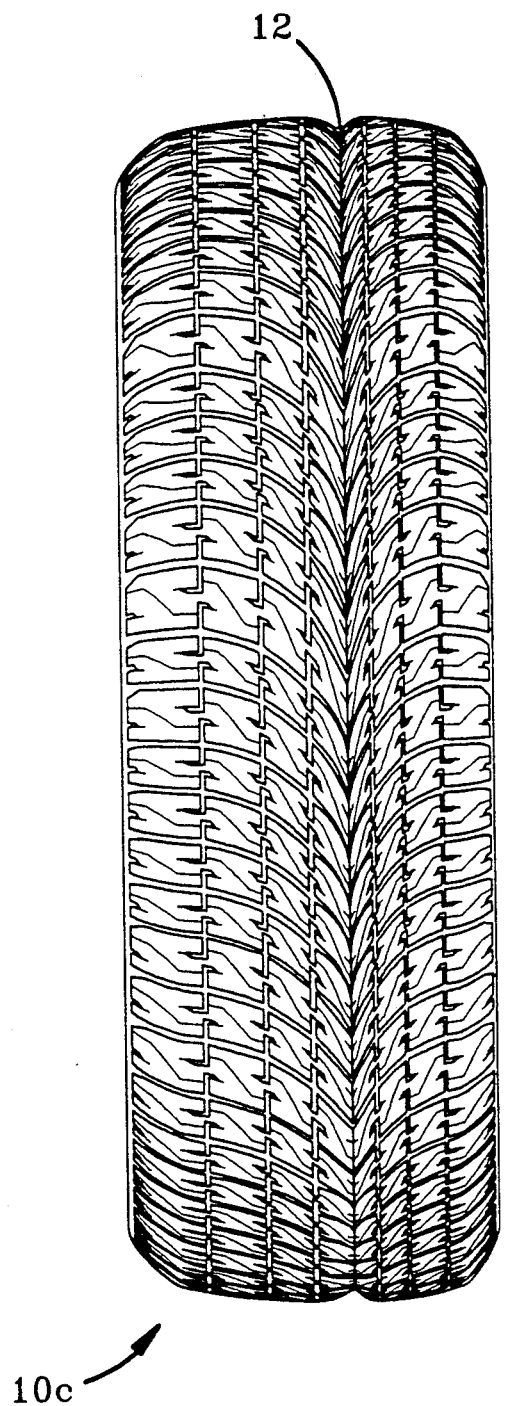
FIG. 5 illustrates a third embodiment of the tire.

With reference now to FIG. 5, an embodiment of the tire 10c of the invention is illustrated in which aqua channel 12 is not centered. Depending on specific road conditions and vehicle suspension geometry, it is believed that aqua channel 12 may be located within 10% of the treadwidth from the tire shoulder on either side of the tire.

With reference again to FIG. 3, a cross section of the tire illustrates that the depth of aqua channel 12 may be less than 100% of the tread depth. In general, it is believed that the aqua channel functions as desired when its depth is 78% to 100% of the total tread depth. Since the lateral grooves 14 initiate in the aqua channel, and lugs 18a are contoured into the aqua channel, as global treadwear occurs and the depth and width of the aqua channel is reduced, additional rubber from the contoured lugs begins to make contact with the road, and additional lengths of lateral lugs make contact with the road, partially offsetting lost properties attributable to treadwear. As a result, it is believed that the beneficial properties of the tire of the invention are retained substantially over the life of the tire.

The contour of the tread, as best illustrated in FIG. 3 is an approximation to a portion of a logarithmic spiral from the equatorial plane of the tire to its shoulder. The ratio of the radius at the shoulder to the radius at the centerline is 0.28 to 0.48, preferably about 0.38. It is believed that this contour of the tread causes a more even distribution of weight in the footprint of the tire which theoretically improves traction and wear properties.

With reference now to FIG. 6, it can be seen that the curved lateral groove 14 causes a natural pitch shift or boundary shift between each lug 18 in the tire. That is, the lugs are not lined up laterally. Since lugs 18 are slightly shifted relative to one another, the lugs enter the footprint during rotation of the tire at different times, and since it is believed that the entry and exit of a lug from the footprint is the primary cause of tire noise, it is believed that noise is dispersed.

It can also be seen that the curvature of the lateral grooves corresponds to a curvature in the shape of the leading and trailing edges of lugs 18. Accordingly, when a lug 18 enters a footprint as a tire rotates, a relatively small edge or point 40 enters the footprint first, leading the way for the larger land area of the center of the lug. It is believed that the shape of the lug further reduces noise and irregular wear because the lug is eased or pried into the footprint by the small leading edge. The curved leading edges 28 of the lugs reduce or spread out the contact impact of the lug by its transitional loading.

It is believed that the noise of the tire can be further reduced by using a tread compound that undergoes a small amount of distortion or is slow to react or rebound either because of its stiffness or because of its relatively high hysteresis, which also reduces acceleration of a lug as it comes out of the footprint. Preferably, such a tread compound will retain good traction properties.

A preferred tread compound used in the tire is an SIBR rubber of the type described in copending U.S. patent applications Ser. No. 07/363,811, filed Jun. 9, 1989 and Ser. No. 07/213,019 filed Jun. 29, 1998, now U.S. Pat. No. 5,053,433, issued Sep. 10, 1991, incorporated herein by reference.

Figure 7:
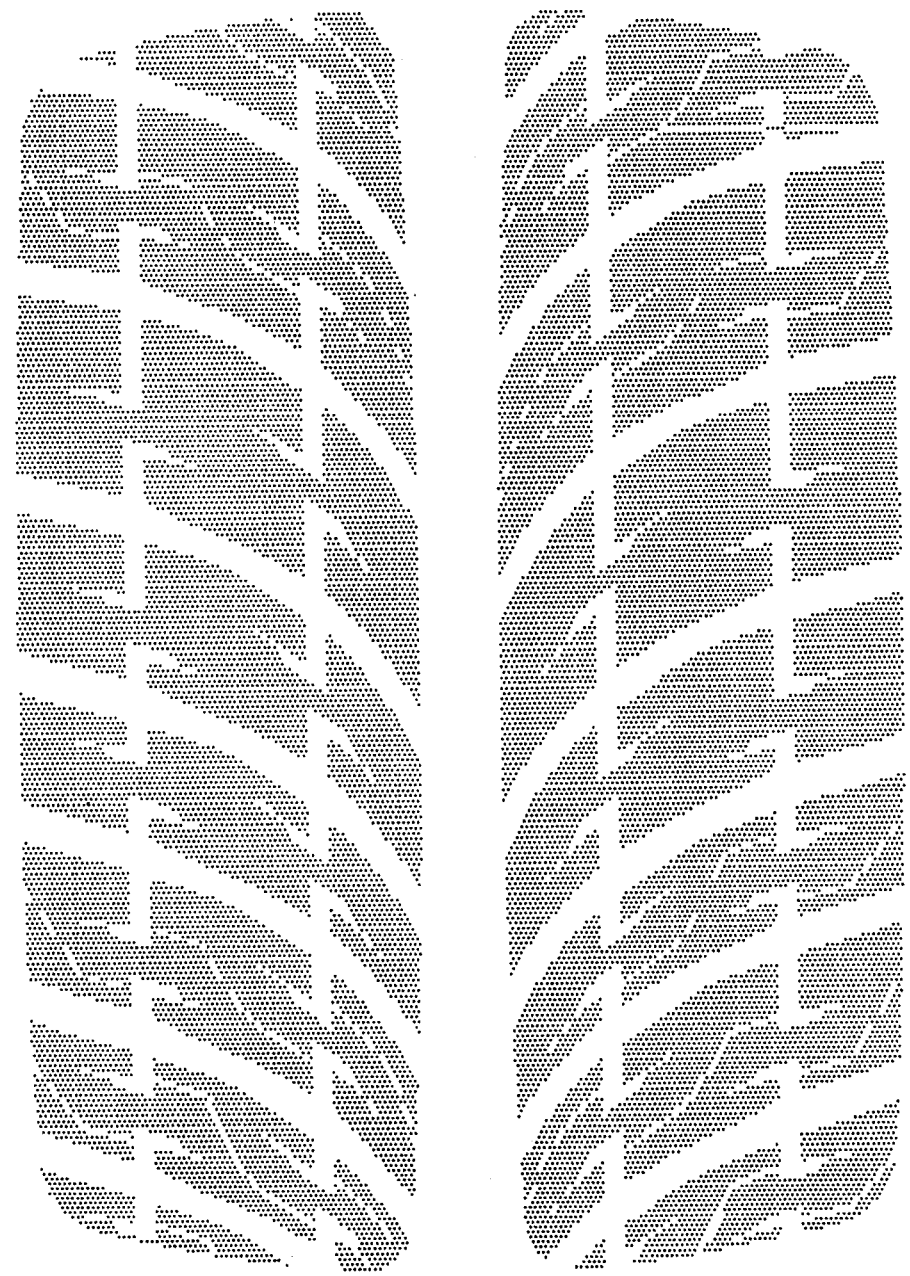
FIG. 7 illustrates a footprint produced by the tire illustrated in FIG. 2.

With reference now to FIG. 7, a footprint of the tire illustrated in FIG. 2 shows an overall oval shape. The footprint comprises two base to base trapezoidally shaped contact patches. There is no collapse in the leading and trailing parts of the footprint as is typical of many prior art tires having a wide center groove. Those skilled in the art will recognize that trapezoidal shaped footprint patches that approach the shape of a rectangle may also be desirable and the invention is not limited by the embodiment shown.

It is generally believed in the art that a footprint with an oval shape (i.e. the center of the tire is prominent in the footprint) has better rolling resistance properties than a tire having a rectangle shape (although more center wear may be expected), and conversely, a tire that has a footprint in which the shoulders are prominent has better traction and handling properties (although more shoulder wear may be expected).

It has been found that the base-to-base trapezoidal shape of the contact patches provides a footprint which pushes water aside, as the tire moves forward, in much the same manner as the bow of a boat moves through the water, thus partially preventing the build up of back pressure by the water. Also, because the center of the tire is prominent, and the lateral grooves are swept back from the center of the tire, this assures that water enters the lateral grooves first near the center of the tire, and as the tire continues through the footprint, this forces the motion of the water toward the shoulder. The water that is not pushed aside, or is not pumped out of the tire through the lateral grooves, is accommodated by the aqua channel. Since, under most conditions, all water is accounted for, water cannot build up under the tire and rubber contact with the road is maintained.

Figure 8:
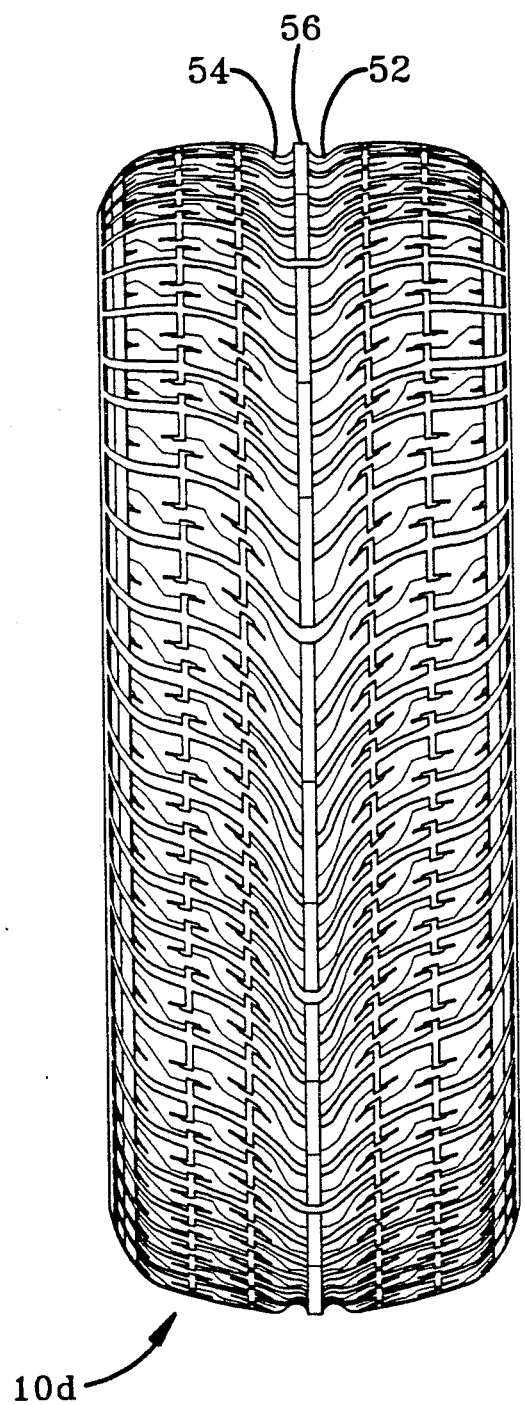
FIG. 8 illustrates an alternative embodiment which has two aquachannels.

In an alternative embodiment, as illustrated in FIG. 8, the tire 10d may be provided with two aquachannels 52,54. Two aquachannels have the advantages that the tire can be used under even more severe wet conditions without hydroplaning since a larger volume of water can be accomodated; they distribute the water channeling capability of the tire over a wider area of the tire; they stabilize the tire by dividing the water channeling void area into two portions away from the center of the tire, instead of having one large void area in the center of the tire; and provide an additional two "shoulders" for lateral traction.

A tire with two aquachannels can be constructed as described above with reference to the other described embodiments.

It is preferred that the total width of the two aquachannels be 1 to 1.5 times the width of the aquachannel illustrated in FIGS. 1-6.

In the illustrated embodiment, where a continuous rib 56 is provided in the center of the tire, the rib causes an even smoother ride, and helps prevent center wear around the aquachannel walls.

In the illustrated embodiment, rib 56 has a width equivalent to 0.5 to 1.5 times the aquachannel depth. The rib can be siped, grooved or may be continuous.

Since the carcass and belt of the tire are conventional and are the same as those used in Eagle GT+4 Tires and comprise 2 polyester carcass plies and 2 steel belts, it is believed that the stability of the footprint, despite the wide aqua-channel, is due in part to lateral stability provided by the curved grooves in the tread. The shape of the tread lugs causes each lug to interact with a large number of radial carcass cords (each lug covers 1½ to 2½ times as many radial reinforcement cords as a non-curved lug of comparable width, and contact force is spread over a large area) and in the tread design where bridges 19 are used, bridges 19 further enhance the lateral stability.

Surprisingly, it has been found that when the tires of the invention are mounted backwards (i.e. with the tread design directionally opposite to the direction which provides optimum wet traction), superior performance in snow is achieved. It is believed that superior traction in snow is obtained for the same reasons that superior wet braking is achieved, i.e. the low trailing groove wall angle and the curved tread design give the tire superior biting properties.

The invention is further illustrated with reference to the following examples.

EXAMPLE 1

This example compares wet and dry slide properties of a tire of the invention (A) and a similar tire made without an aqua channel (B) to a commercially available rain tire (Uniroyal Tigerpaw TM) as a control. The results are normalized to control equal 100.

| | RESULTS | | | | | | | |
|---|---|---|---|---|---|---|---|---|
| | WET 20 | | WET 40 | | WET 60 | | DRY 40 | |
| CONST | PEAK | SLIDE | PEAK | SLIDE | PEAK | SLIDE | PEAK | SLIDE |
| CONTROL | 100 | 100 | 100 | 100 | 100 | 100 | 100 | 100 |
| A | 124+ | 123+ | 132+ | 111+ | 125+ | 101= | 106+ | 111+ |
| B | 113+ | 112+ | 123+ | 97− | 119+ | 78− | 105+ | 107+ |

Note:
+ means better than the control within a 95% confidence level
= means equal to the control within a 95% confidence level
− means worse than the control within a 95% confidence level All tests were made on an asphalt surface. The results under the heading Wet 20 indicates the normalized length of the slide when full braking was initiated at 44 kph (20 mph) on a wet asphalt surface. The headings of the other tests are similarly descriptive.

For wet traction, the aqua channel appears to have a significant effect. The average peak and slide ratings were 11 to 12% higher with the aqua channel than without. The aqua channel appears to have little effect on dry traction.

The aqua channel used in this test was the narrower, shallower design illustrated in FIG. 1. The lateral and annular grooves had the configuration illustrated in FIG. 2.

EXAMPLE 2

This example illustrates a snow handling test. This test measures the "g"s encountered during acceleration, deceleration (on braking), and cornering. Measurements were made using instruments or were calculated from the data obtained. The control is an Invicta GS tire, #2 is a tire of the invention made using an SIBR terpolymer tread compound, #3 is a tire of the invention made using the same tread rubber as the control which was mounted backwards, #4 is the same tire as #3 mounted in the intended direction, and #5 is a Michelin XA4 tire. All tires were size P205/70R14.

| | CONTROL | #2 | #3 | #4 | #5 |
|---|---|---|---|---|---|
| ACCELERATION | .17 | .17 | .17 | .15 | .15 |
| DECELERATION | .42 | .42 | .39 | .40 | .39 |
| CORNERING | .28 | .28 | .28 | .26 | .28 |

A difference of 0.02 is the detectable limit of the test. Higher numbers show better results. The data indicates that, for these parameters, the tire of the invention is at least equivalent to all season tires now in use.

The same tires were evaluated subjectively in a packed snow handling test with the following results:

| SUBJECTIVE PACKED SNOW HANDLING | | | | | |
|---|---|---|---|---|---|
| AMBIENT TEMP: | 0–6 | | | | |
| SURFACE TEMP: | 5–9 | | | | |
| DATE: | 1-30-91 | | | | |
| DRIVER: | NEALE | | | | |
| | CONTROL | #2 | #3 | #4 | #5 |
| ACCEL: TRACTION | 5 | 5 | 5 | 4.5 | 4.5 |
| ACCEL: YAW STABILITY | 5 | 5 | 4.5 | 5 | 4 |
| ACCEL: 0–50M TIME-SECONDS | 7.94 | 7.95 | 7.92 | 8.06 | 8.41 | 8.34 |
| STANDARD DEV. | 5 | 5 | 4.5 | 4.5 | 4.5 |
| BRAKE: TRACTION | | | | | |
| LAT. TRACTION FRONT | 5 | 5 | 5 | 4 | 5 |
| LAT. TRACTION REAR | 5 | 5 | 5.5 | 4 | 5.5 |

Control Good straight line, slow front response - then rear slide
Set 2 Similar to Control
Set 3 Initial turn-in good, little rear slide, good balance.
Set 4 Followed ruts, slow to turn-in, then rear slide less grip.
Set 5 Mich... Good lat grip. good overall balance, good turn in.

In the subjective packed snow handling, the driver rated the performance of each tire subjectively. Higher numbers in the subjective ratings indicate better results.

EXAMPLE 3

In a different size (as compared to Example 2), the "g" measurements and subjective snow handling test were repeated comparing an Arriva tire as a control (size P185/70R13), (#2) Corsa GT as a second control, (#3) the tire of the invention, and (#4) a Michelin XA4. As in example 2, "g"s were measured, and the driver provided his subjective conclusions.

| | CONTROL | #2 | #3 | #4 |
|---|---|---|---|---|
| ACCELERATION | .17 | .15 | .14 | .13 |
| DECELERATION | .42 | .39 | .40 | .39 |
| CORNERING | .29 | .30 | .25 | .27 |

General Test Details
1. Wheels 5×13
2. 29 psi inflation
3. Vehicle: Corolla

The acceleration, deceleration and cornering data, as measured by the instruments, seems to indicate that, except that Arriva was measurably better than the Michelin XA4, the four tires had comparable properties.

The subjective rating given by the driver is tabulated below, along with the driver's comments.

| SUBJECTIVE PACKED SNOW HANDLING - T74 | | | | |
|---|---|---|---|---|
| AMBIENT TEMP: | 18–20 | | | |
| SURFACE TEMP: | 16–18 | | | |
| DATE: | 1-27-91 | | | |
| DRIVER: | NEALE | | | |
| | CONTROL | #2 | #3 | #4 |
| ACCEL: TRACTION | 5 | 4.5 | 4 | 4 |
| ACCEL: YAW STABILITY | 5 | 4 | 4.5 | 4 |
| ACCEL: 0–50M TIME-SECONDS | 7.78 | 8.47 | 8.78 | 8.83 |

-continued

| SUBJECTIVE PACKED SNOW HANDLING - T74 | | | | |
|---|---|---|---|---|
| BRAKE: TRACTION | 5 | 5 | 5 | 5 |
| LAT. TRACTION FRONT | 5 | 4.5 | 4 | 4.5 |
| LAT. TRACTION REAR | 5 | 4.5 | 4 | 4.5 |

Control  Good balance, slt o.s.
Set 2  Push, then rear slide, followed ruts
Set 3  Less lat grip, straight line down slightly but didn't follow ruts as badly as Set #2
Set 4  Like Control but less grip, poor on following ruts In the subjective ratings, the higher numbers indicate the best results.

The Arriva had a good balance between straight line and lateral grip. The Corsa GT, while generating good lateral readings on the G-Analyst, understeered for the first third of the turn, then proceeded to oversteer around the rest of the turn. The tire of the invention just lacked lateral grip and usually finished the turn in a four wheel slide. The Michelin also had a good balance of traction, just at a lower limit than the Arriva.

EXAMPLE 4

Tires of the invention, along with a set of Invicta GS controls and Michelin XA4 tires, were tested for wet handling.

In the test, an Invicta GS was used as a control, a tire of the invention made without bridges between lugs was set #2, a tire of the invention made using bridges laterally between lugs was set #3, and a Michelin XA4 was set #4.

| WET HANDLING - FRONT WHEEL & 4 WHEEL DRIVE DRIVER: STOLL | | | | |
|---|---|---|---|---|
|  | CONTROL | #2 | #3 | #4 |
| AVG. LAP TIME | 57.93 | 56.64 | 56.37 | 58.62 |
| S.D. | .19 | .08 | .03 | .14 |
| CIRCLE LAT Gs | .669 | .690 | .700 | .642 |
| S.D. | .003 | .004 | .003 | .001 |
| STRAIGHT LINE HYDROPLANING | 5 | 5.5 | 5.5 | 4.5 |
| LATERAL HYDROPLANING | 5 | 5.5 | 5.5 | 4.5 |
| STEERING RESPONSE | 5 | 5.5 | 6 | 4.5 |
| OVERSTEER | 5 | 5 | 5.5 | 4.5 |
| OFF THROTTLE OVERSTEER | 5 | 5 | 5.5 | 4.5 |
| TRACTION TRANSITION | 5 | 5 | 5.5 | 4 |
| LATERAL GRIP | 5 | 6 | 5.5 | 4.5 |
| BRAKING TRACTION | 5 | 7 | 6.5 | 5.5 |
| ACCELERATION TRACTION | 5 | 6 | 5.5 | 4.5 |

General Test Details
1. Wheels 5.5×14JJ stamped steel
2. Inflation: 35 psi, F&R
3. Load: Driver
4. Vehicle Characteristics: Stock, aligned to OE specs Comments Set 1. (Control) Lots of off-throttle oversteer. Car gets real squirrely in transients. Poor F/R balance in braking—lots of rear bias. Also, lots of understeer while powering out of corners.

Set 2. Braking grip is phenomenal compared to last set . . . quantum-leap improvement. Tires have more stopping power than car has brakes. Also, very good grip in cornering and acceleration. Tires feel like they have much better road contact.

Set 3. Most precise steering of all sets. Very good braking. Excellent controllability in transients, minimal O/S, good acc. grip in powering out of corners, good cornering grip.

Set 4. Tires are just slippery all over. Not predictable or smooth. Car pushes a lot under power, but rear gets real loose in transients off-throttle. Not great braking . . . only marginally better than controls.

CONCLUSIONS

Sets 2 and 3 were the best overall. Set 2 had braking, cornering, and acceleration grip that was far superior to the controls; it was also better than any of the sets as well. Set 3 had wet grip that was nearly equal to that of set 2, and was actually superior to set 2 for oversteer parameters. Set 3 also had a steering feel that was more precise and responsive than any other set. Further, set 3 was the fastest set tested, on both the 60.96 m (200 ft) circle as well as the handling course itself. It was a very easy set to drive fast in the wet.

While specific embodiments of the invention have been illustrated and described, it will be recognized by those skilled in the art that the invention may be variously modified and practiced without departing from the spirit of the invention. The invention is limited only by the following claims.

What is claimed is:

1. A pneumatic tire for use on paved surfaces having an aspect ratio of 0.35 to 0.80 comprising a pair of annular beads, carcass plies wrapped around said annular beads, a directional tread having circumferential grooves and lateral grooves disposed over said carcass plies in a crown area of said tire, and sidewalls disposed between said tread and said beads, wherein said tread is directional and has a footprint net-to-gross ratio of 50% to 70% and two annular aqua channels having a total width of about 10% to 33% of total treadwidth based on the footprint of the tire and a depth of 78% to 100% of total tread depth and a curvate U-shape, and wherein lateral grooves intersect circumferential grooves between said annular aqua channel and said shoulder, intersections of circumferential grooves and lateral grooves defining lugs, and wherein the total length of said lateral grooves is substantially longer than the width of said tread and wherein said tread has a contour approximating a logarithmic spiral from the equatorial plane of the tire to its shoulder, and wherein a rib having a width comprising 0.5 to 1.5 times the aquachannel depth separates said two aqua channels.

2. The pneumatic tire of claim 1 in which each said aqua channel width is about 15% of said tread width.

3. The pneumatic tire of claim 1 in which each said aqua channel depth is 82% to 92% of said tread depth.

4. The pneumatic tire of claim 1 in which said circumferential grooves are discontinuous and said lugs are connected to one another by bridges that comprise 10% to 20% of the width of the block elements to which they are attached.

* * * * *